(12) United States Patent  (10) Patent No.: US 8,391,717 B2
McLaren et al.  (45) Date of Patent: Mar. 5, 2013

(54) FLOW-CONTROL METHODS AND SYSTEMS FOR MULTIBUS SYSTEMS

(75) Inventors: Moray McLaren, Bristol (GB); Nathan Lorenzo Binkert, Redwood City, CA (US); Alan Lynn Davis, Coatville, CA (US); Norman Paul Jouppi, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 310 days.

(21) Appl. No.: 12/785,962

(22) Filed: May 24, 2010

(65) Prior Publication Data

US 2011/0286743 A1 Nov. 24, 2011

(51) Int. Cl.
*H04J 14/00* (2006.01)
(52) U.S. Cl. .......................................... 398/73; 398/70
(58) Field of Classification Search .............. 398/66–68, 398/82, 91, 73
See application file for complete search history.

(56) References Cited

U.S. PATENT DOCUMENTS

| 5,838,684 | A * | 11/1998 | Wicki et al. ................... 370/416 |
| 6,574,232 | B1 * | 6/2003 | Honig et al. .................. 370/413 |
| 7,035,540 | B2 | 4/2006 | Finan et al. |
| 7,603,035 | B2 | 10/2009 | Kinoshita et al. |
| 2005/0276604 | A1 * | 12/2005 | Morrow et al. ................. 398/73 |
| 2006/0251421 | A1 * | 11/2006 | Arnon ............................ 398/73 |
| 2009/0080334 | A1 | 3/2009 | DeCusatis et al. |
| 2009/0086635 | A1 | 4/2009 | DeCusatis et al. |

OTHER PUBLICATIONS

"I/O Consolidation in the Data Center", Desanti, Claudio et al., Cisco Press, Sep. 23, 2009.

* cited by examiner

*Primary Examiner* — Dalzid Singh

(57) ABSTRACT

Methods and systems are provided that prevent buffer overflow in multibus systems. In one aspect, a method for controlling the flow of data in a multibus system includes, for each node having an associated broadcast bus in the multibus system, generating status information regarding available data storage space of each receive buffer of the node. The method includes broadcasting the status information to the other nodes connected to the broadcast bus and collecting status information regarding the available storage space of receive buffers of the other nodes connected to the broadcast bus. The method also includes determining whether or not to send data from the node to at least one of the other nodes over the broadcast bus based on the collected status information.

20 Claims, 15 Drawing Sheets

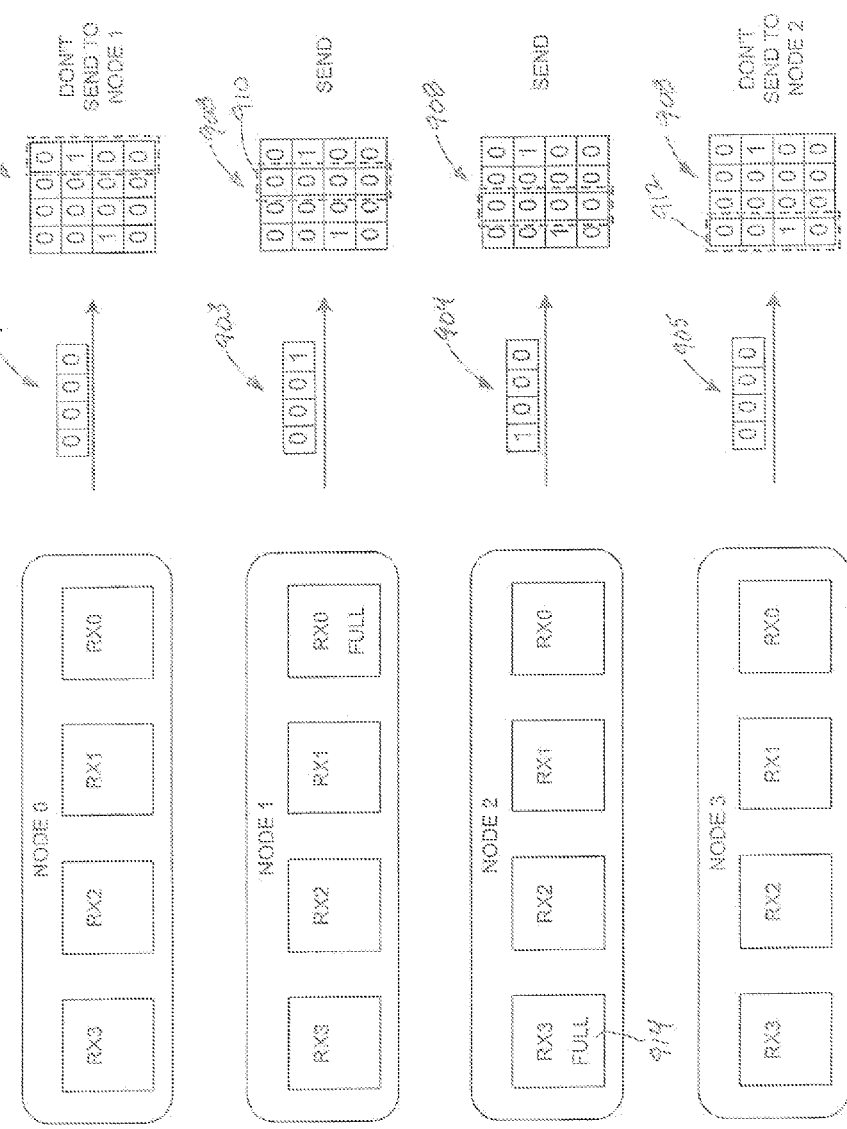

FLOW-CONTROL METHODS AND SYSTEMS FOR MULTIBUS SYSTEMS

TECHNICAL FIELD

Computer systems, and, in particular, methods and systems for controlling buffer overflow in a multibus systems, are disclosed.

BACKGROUND

Organizations that maintain and manufacture data centers face increasing bandwidth demands. In particular, the bandwidth requirement for typical data center switches is increasing dramatically due to the growth in data center size and due to the shift to higher bandwidth link standards, such as 10 Gb, 40 Gb, and 100 Gb Ethernet standards. However, simply sealing up the bandwidth of existing electronic switch designs can be problematic. The scope for increasing the data rate of electronic signals is often limited by signal integrity considerations. Also, increasing the bandwidth of data paths increases cost and may be impractical. The energy efficiency of elements of the data center has become an important consideration, because as data rates increase a greater proportion of the power consumed by network switches can be attributed to electronic interconnects. Moreover, electronic switched fabrics typically used to handle switching in a data center, use point-to-point flow control on each individual link. As a result, flow control is buffered on every link in order to avoid data loss. Switch manufacturers and users continue to seek interconnect solutions for switches that provide for several generations of bandwidth scaling at reduced interconnect power, without increasing overall system cost.

BRIEF DESCRIPTION OF THE DRAWINGS

FIG. 9 shows a second example of buffers associated with four nodes configured and operated in accordance with one or more examples.

DETAILED DESCRIPTION

Figure 1:
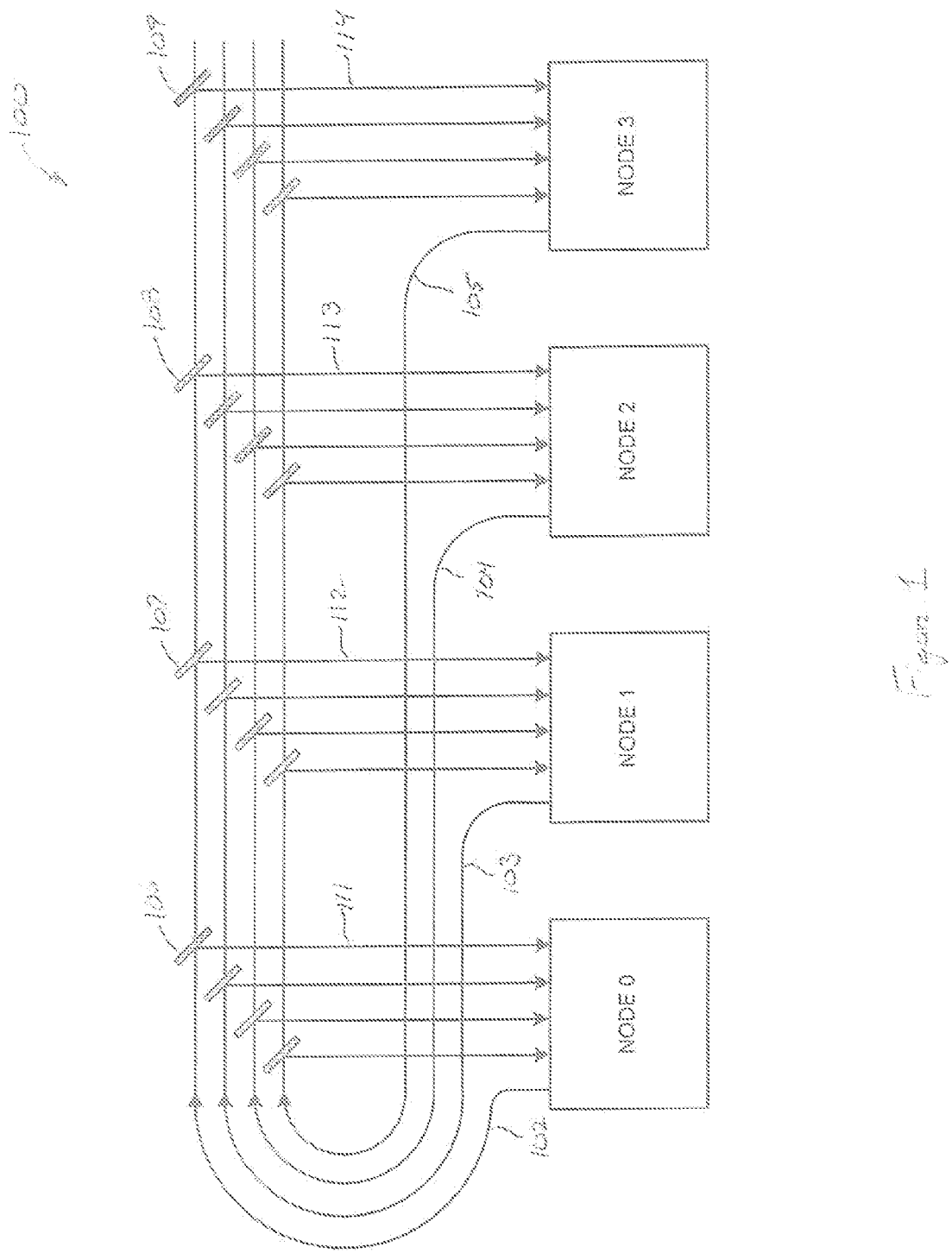
FIG. 1 shows a schematic representation of a first example multibus optical interconnect fabric.

Methods and systems that prevent buffer overflow in multibus systems are disclosed. In particular, method and system examples disclosed herein are directed to multicast flow control methods and to multicast flow control systems that prevent buffer overflow in multibus systems. The methods and systems can be adapted to a variety of different types of multicast routing schemes ranging from broadcasting to unicasting. The term broadcasting refers to simultaneously transmitting data to all destination nodes, while the term unicasting refers to sending messages to a single destination node. The multibus system can be implemented using multibus optical interconnect fabrics that can be used to replace packet switch devices in systems such as a sealable switches and multiprocessors. If the aggregate input bandwidth at any particular time exceeds either the internal bandwidth of the switch or the aggregate output bandwidth then information can be lost or corrupted. In order to avoid loss or corruption, the switch will need to have potentially unbounded input buffer capacity or flow control must be employed to prevent buffer overflow. Only the latter solution is possible. An example method and system prevents buffer overflow by periodically distributing buffer status information to all nodes. Every node receives the status information and knows the status of all buffers in the system. Each node filters the buffer status information to maintain only the status of the buffers connected to the node's transmit bus. When status information received by a node indicates that any of the buffers which the node transmits to is full, the node stops transmission.

The detailed description is organized into three subsections as follows: A description of multibus optical interconnect fabrics is provided in a first subsection in order to give an example multibus system in which flow control methods and systems can be applied. Flow control methods and flow control systems are described in the second and third subsections, respectively. Note that although flow control methods and systems are described with reference to an example multibus optical interconnect fabric, the methods and systems are not intended to be so limited. In practice, an example flow control method and system can be implemented in many different kinds of optical and electrical multibus systems.

Multibus Optical Interconnect Fabrics

Multibus optical interconnect fabrics ("optical fabrics") transmit data encoded in optical signals. An optical signal encodes information in high and low amplitude states or phase changes of a channel of electromagnetic radiation. A channel refers to a single wavelength of electromagnetic radiation or a narrow band of electromagnetic radiation centered about a particular wavelength. For example, a high amplitude portion of an optical signal can represent a logic binary value ("bit") "1" and a low amplitude portion of the same optical signal can represent a bit "0," or vice versa. Optical fabrics can use multiple optical buses implemented in low loss waveguides and optoelectronics to replace the electronic connections and electronic fabric switches found in scalable data center switches. Optical fabrics are less constrained by signal integrity considerations and are amenable to higher spectral efficiency through the use of wavelength division multiplexing ("WDM") and various modulation formats. Optical communication with optical signals can also be more power efficient than communication with electronic signals due to the low loss properties of the optical channels.

FIG. 1 shows a schematic representation of an example multibus optical interconnect fabric 100. The optical fabric 100 includes four optical broadcast buses ("broadcast buses") 102-105 enabling each of the four nodes labeled 0, 1, 2, and 3 to broadcast optical signals to itself and to three other nodes. As shown in the example of FIG. 1, each broadcast bus is optically coupled at one end to one of the nodes 0, 1, 2, and 3. A node can include any combination of processors, memory, memory controllers, electrical-to-optical engines, optical-to-electrical engines, clusters of multi-core processing units, a circuit board, external network connections, or any other data processing, storing, or transmitting device. For example, the nodes 0-3 can be line cards in an optical communication switch, as described below in the subsequent subsection. In the example of FIG. 1, the optical fabric 100 includes 16 optical tap arrays distributed so that four optical tap arrays are located along each broadcast bus. Each optical tap array is configured to divert a portion of the optical power associated with the optical signals carried by a broadcast bus to a corresponding node. For example, four optical tap arrays 106-109 are distributed along broadcast bus 102. When node 0 broadcasts optical signals over broadcast bus 102, optical tap array 106 diverts a portion 111 of the optical power associated with the optical signals back to node 0, optical tap array 107 diverts a portion 112 of the optical power associated with the optical signals to node 1, optical tap array 108 diverts a portion 113 of the optical power associated with the optical signals to node 2, and optical tap array 109 diverts a portion 114 of the optical power associated with the optical signals to node 3. As a result, nodes 0, 1, 2, and 3 receive the same information encoded in the optical signals broadcast by node 0, but at a fraction of the optical power associated with the optical signals output from node 0.

Figure 2:
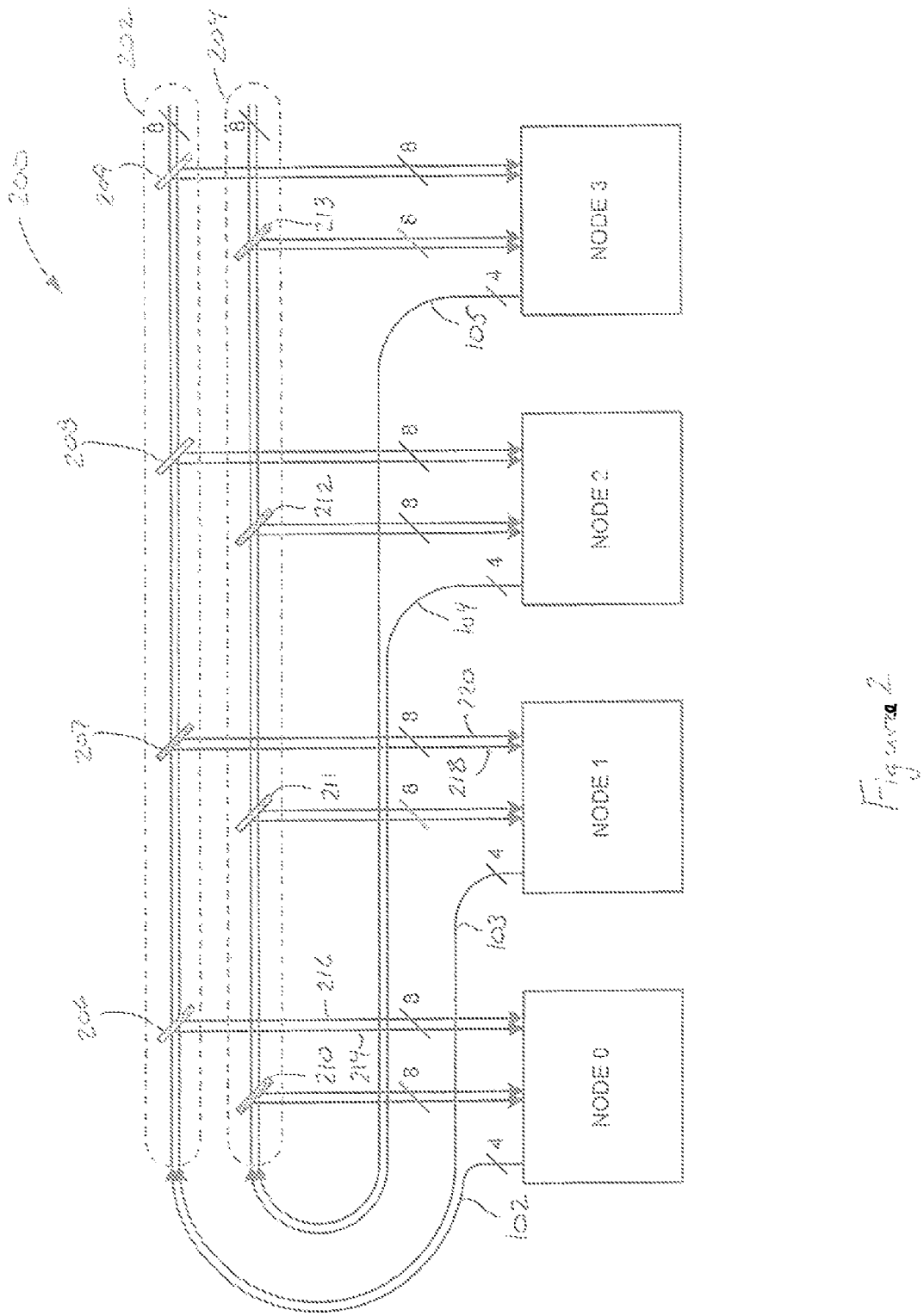
FIG. 2 shows a schematic representation of a second example multibus optical interconnect fabric.

In other examples, the broadcast buses of multibus optical fabrics are bundled reducing the number of optical tap arrays. FIG. 2 shows a schematic representation of an example multibus optical interconnect fabric 200. The optical fabric 200 is similar to the optical fabric 100, but instead of using 16 optical tap arrays, the broadcast buses are bundled, reducing the number of optical tap arrays by a factor of 2. In particular, optical fabric 200 includes the same four broadcast buses 102-105 as optical fabric 100, but with broadcast buses 102 and 103 bundled to form a bundled broadcast bus 202 and broadcast buses 104 and 105 bundled to form a bundled broadcast bus 204. Optical fabric 200 includes four optical tap arrays 206-209 distributed along bundled broadcast bus 202 and four optical tap arrays 210-213 distributed along bundled broadcast bus 204. Each optical tap array is configured to divert a portion of the optical power associated with optical signals carried by a bundled broadcast bus to a corresponding node. For example, suppose that node 0 is broadcasting a first set of optical signals on broadcast bus 102 and node 1 is broadcasting a second set of optical signals on broadcast bus 103. Optical tap array 206 is configured to divert a portion 214 of the optical power associated with the first set of optical signals back to node 0 and divert a portion 216 of the optical power associated with the second set of optical signals to node 0. Optical tap array 207 is configured to divert a portion 218 of the optical power associated with the first set of optical signals to node 1 and divert a portion 220 of the optical power associated with the second set of optical signals back to node 1. Optical tap arrays 208 and 209 divert portions of the optical power associated with the first and second sets of optical signals to nodes 2 and 3, respectively. As a result, the nodes 0, 1, 2, and 3 receive the same information encoded in the first and second sets of optical signals broadcast by nodes 0 and 1.

In the example of FIG. 2, the broadcast buses are composed of four waveguides. For example, as shown in FIG. 2, where broadcast bus 102 couples to node 0, slash "/" with the number "4" indicates that broadcast bus 102 is composed of four waveguides, and where optical tap array 206 diverts portions 214 and 216 of the optical power carried by bundled broadcast bus 202 of optical signals to node 0 is composed of 8 waveguides.

Figure 3:
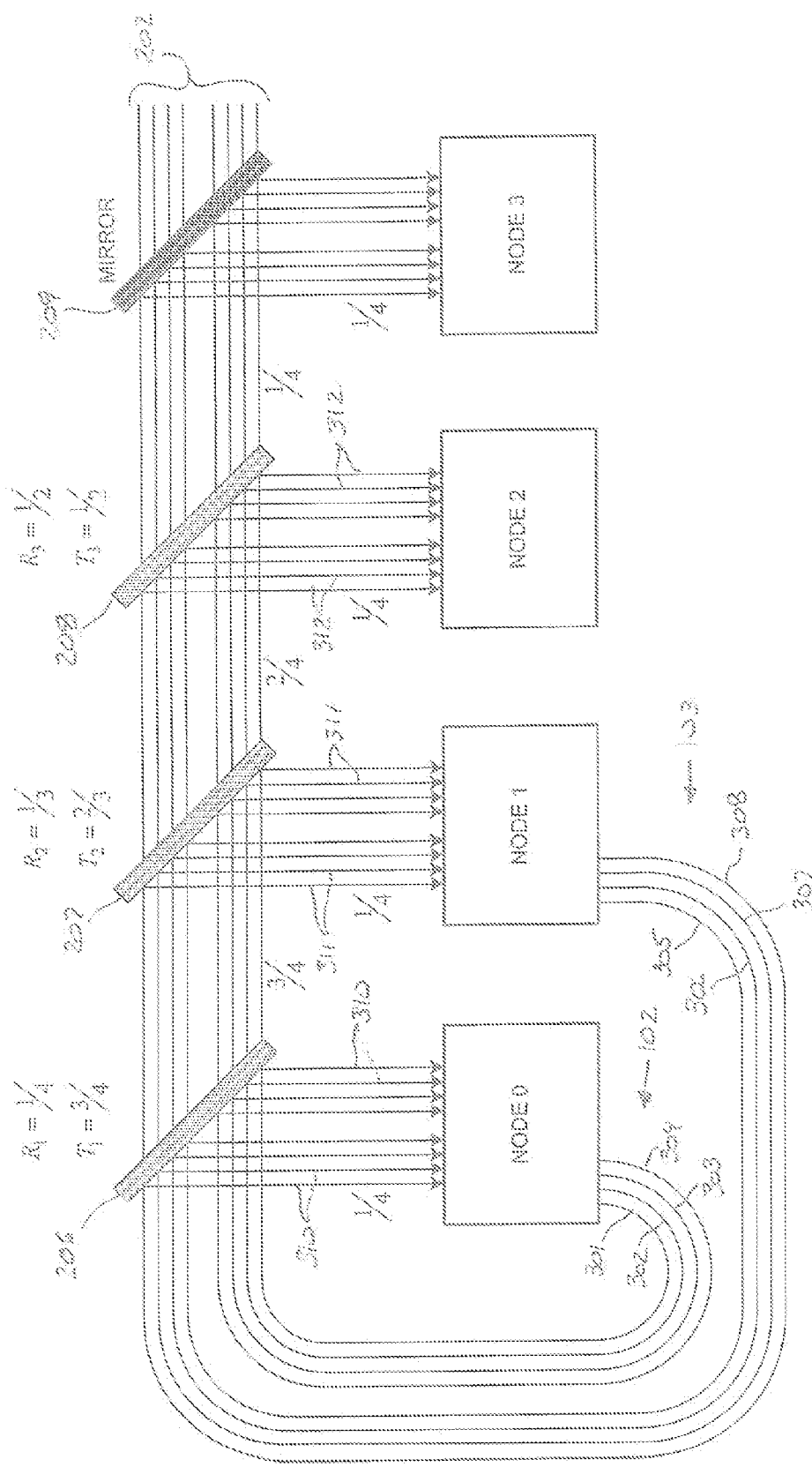
FIG. 3 shows an example of bundles of waveguides associated with two broadcast buses.

FIG. 3 shows the waveguides comprising the broadcast buses 102 and 103. In particular, broadcast bus 102 is composed of waveguides 301-304, and broadcast bus 103 is composed of waveguides 305-308. Each waveguide of a broadcast bus can transmit a separate optical signal generated by a node. For example, node 0 can broadcast data encoded in four separate optical signals, each optical signal carried by one of the four waveguides 301-304. Each optical tap array is composed of a number of optical taps, each of which is configured to divert a portion of the optical power associated with an optical signal carried by one of the waveguides. For example, optical tap array 206 is composed of eight optical taps (not shown) with each optical tap configured to divert a portion of the optical signal carried by one of the waveguides 301-308 toward node 0.

FIG. 3 also reveals how the optical tap arrays can be configured to divert, using partial reflection, a portion of the optical power associated with the optical signals transmitted in the bundles of broadcast buses. In certain examples, the optical tap arrays distributed along a broadcast bus, or bundle of broadcast buses, can be configured so that each node receives approximately the same optical power associated with each optical signal. For example, as shown in the example of FIG. 3, suppose that the optical power associated with each optical signal carried by the waveguides 301-308 is represented by P. In order for each node to receive the optical signals with approximately the same optical power P/4, optical tap array 206 is configured to reflect approximately ¼ and transmit approximately ¾ of the optical power of each optical signal carried by the waveguides 301-308. As a result, the optical power of each optical signal 310 reflected toward node 0 is approximately P/4, and the optical power of each transmitted optical signal is approximately 3P/4. The optical tap array 207 is configured to reflect approximately ⅓ and transmit approximately ⅔ of the optical power of each optical signal carried by the waveguides 301-308. As a result, the optical power of each optical signal 311 reflected toward node 1 is approximately P/4 (i.e., ⅓×3P/4), and the optical power of each transmitted optical signal is approximately P/2 (i.e., ⅔×3P/4). The optical tap array 208 is configured to reflect and transmit approximately ½ of the optical power of the optical signals carried by waveguides 301-308. As a result, the optical power of each optical signal 312 reflected toward node 2 is approximately P/4 (i.e., ½×P/2), and the optical power of each transmitted optical signal is also approximately P/4 (i.e. ½×P/2). The optical tap array 209 can be a fully reflective mirror that reflects the optical signals with the remaining optical power, P/4, to node 3.

Multibus optical interconnect fabrics are not limited to optically interconnecting four nodes. In other examples, optical fabrics can be configured to accommodate as few as 2 nodes and as many as 5, 6, 7, or 8 or more nodes. The maximum number of nodes may be determined by the optical power of the optical signals, the overall system loss, and the minimum sensitivity of the receivers used to detect the optical signals located at each node, as described below with reference to FIG. 5. In general, the optical tap arrays distributed along a broadcast bus, or bundle of broadcast buses, are configured so that when a node broadcasts an optical signal, each of the nodes, including the broadcasting node, receives approximately 1/n of the total optical power P of the optical signal, where n is the number of nodes.

Figure 4:
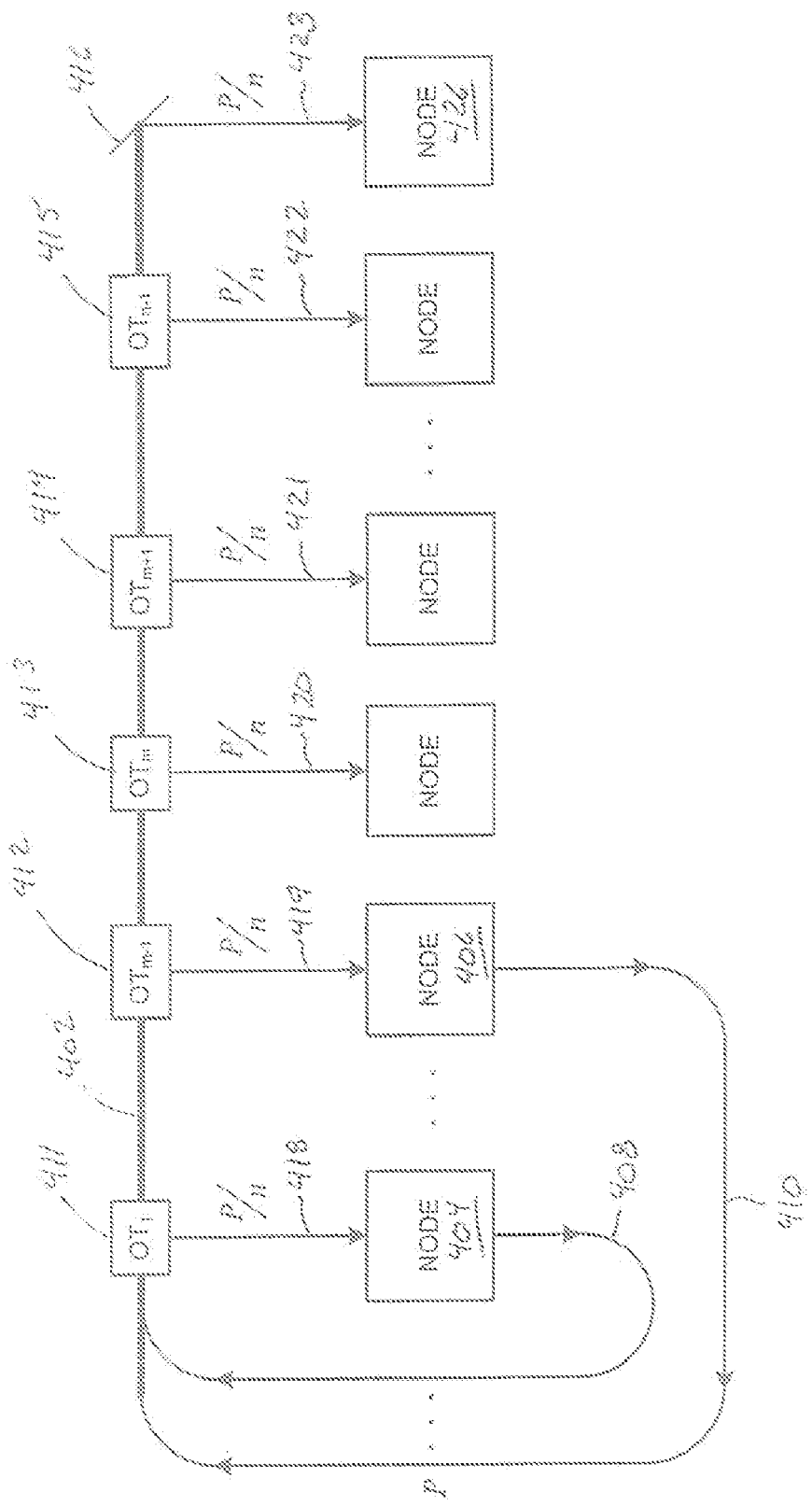
FIG. 4 shows a schematic representation of n nodes in optical communication over a bundle of broadcast buses.

FIG. 4 shows an example of n nodes in optical communication with a bundle of broadcast buses 402 coupled to n nodes, two of which are represented by nodes 404 and 406. The broadcast buses, such as broadcast buses 408 and 410, comprising the bundle of broadcast buses 402 can be composed of any suitable number of waveguides. The optical fabric includes n optical tap arrays distributed along the bundle of broadcast buses 402, a few of which are represented by optical tap arrays 411-416. Node 406 outputs optical signals onto the broadcast bus 410 with optical power P. The optical tap arrays are configured so that each node receives a reflected portion of the optical signals with approximately the same optical power of P/n, as indicated by directional arrows 418-423.

The optical tap arrays denoted by $OT_m$ in FIG. 4 reflect a fraction of the optical signal power to an optically coupled node in accordance with:

$$R_m \approx \frac{1}{(n-m+1)}$$

and transmit a fraction of the optical signal power in accordance with:

$$T_m \approx \frac{(n-m)}{(n-m+1)}$$

where m is an integer ranging from 1 to n. Thus, an optical tap array $OT_m$ receives an optical signal and outputs a reflected portion with optical power $PR_m$ toward an optically coupled node and outputs a transmitted portion with optical power $PT_m$, where $P=PR_m+PT_m+L_m$ with $L_m$ representing the optical power loss at the optical tap array $OT_m$ due to absorption, scattering, or misalignment. Note that the optical tap array 416 $OT_n$ can be a mirror that reflects the remaining portion of optical power transmitted by broadcast bus 402 to node 426.

Note that optical fabric examples describe diverting a portion of the optical signals generated by a node back to the same transmitting node. This is done for two primary reasons: 1) it ensures that the mirror reflectivity is identical for all the taps in an array of taps, and that the tap structure is identical at each point on the bus except for the value of reflectivity of the tap array mirror. In practice, the optical tap arrays can be fabricated as a single piece of material and are distributed across all of the waveguides of a bundle of broadcast buses, as shown in FIGS. 2 and 3. In other words, it may not be practical in implementing an optical fabric with a large numbers of waveguides per bundle with optical tap arrays that distinguish particular waveguides that do not divert optical signals. 2) By diverting optical signals back to the source node from which they originated, the source node is able to perform diagnostic tests on the optical signals, such as testing optical signal integrity.

In other examples, the broadcast buses of a multibus optical interconnect fabric can be implemented using star couplers. For example, returning to FIG. 1, a star coupler comprising one input port and four output ports can replace the broadcast bus 1 and optical tap arrays 106-109, where the input port carries the optical signals carried by broadcast bus 102 and each of the four output ports carries one of the optical signals 111-114. Each star coupler can be configured so that an optical signal received in the input port is split into four output optical signals, each output optical signal carrying approximately ¼ of the optical power of the input optical signal.

Figure 5:
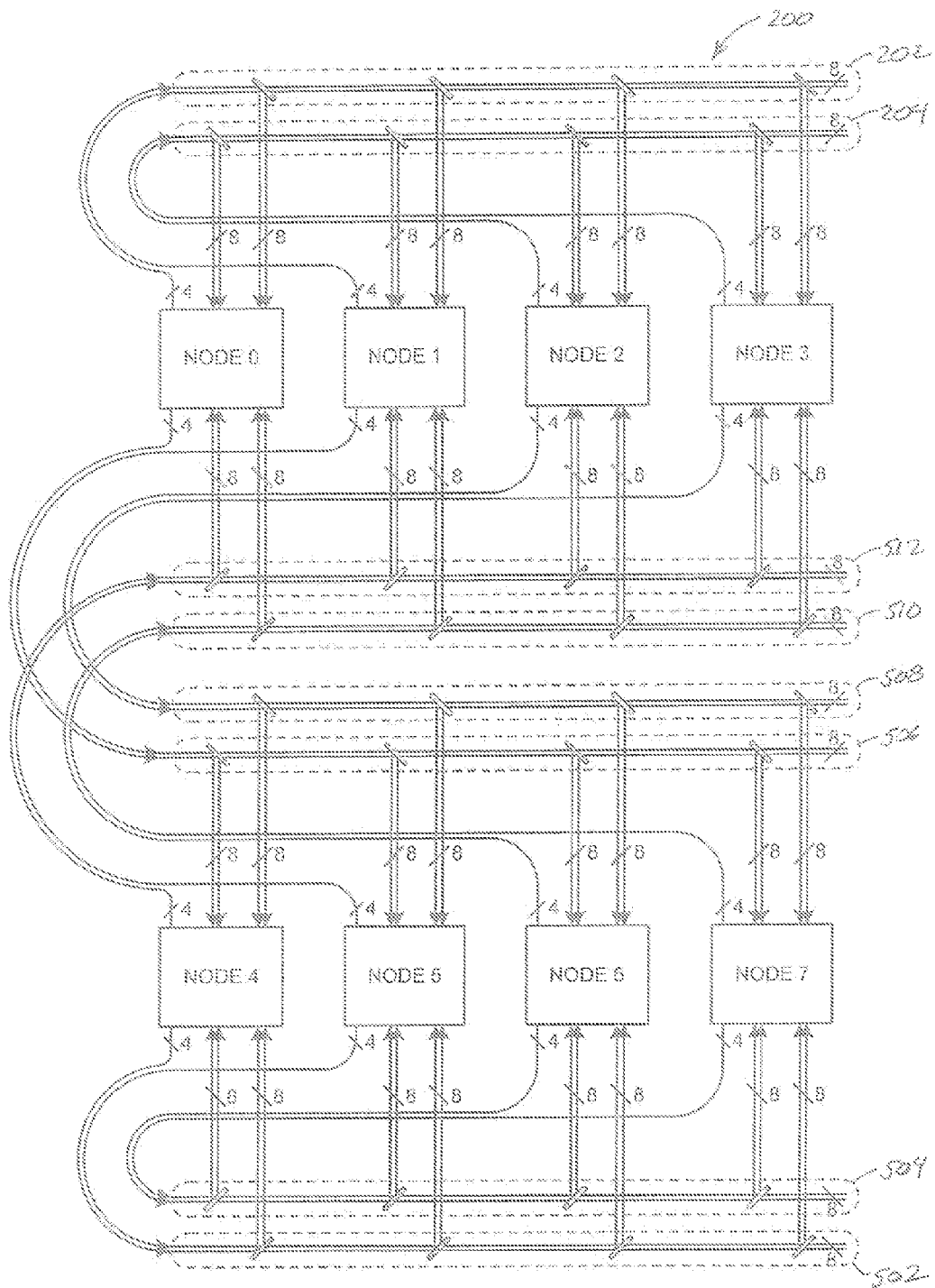
FIG. 5 shows a schematic representation of four multibus optical interconnect fabrics.

The methods and systems herein are not limited to nodes broadcasting over a single multibus optical interconnect fabric. In other examples, nodes can communicated over more than one multibus optical interconnect fabric. FIG. 5 shows a schematic representation of an example of four multibus optical interconnect fabrics enabling eight nodes to broadcast optical signals. As shown in the example of FIG. 5, nodes 0-3 broadcast optical signals over optical fabric 200, as described above. Like nodes 0-3 described above, nodes 4-7 broadcast optical signals to each other over bundles of broadcast buses 502 and 504. FIG. 5 also reveals that nodes 0-3 broadcast optical signals to nodes 4-7 over bundles of broadcast buses 506 and 508, and that nodes 4-7 broadcast optical signals to nodes 0-3 over bundles of broadcast buses 510 and 512.

Figure 6:
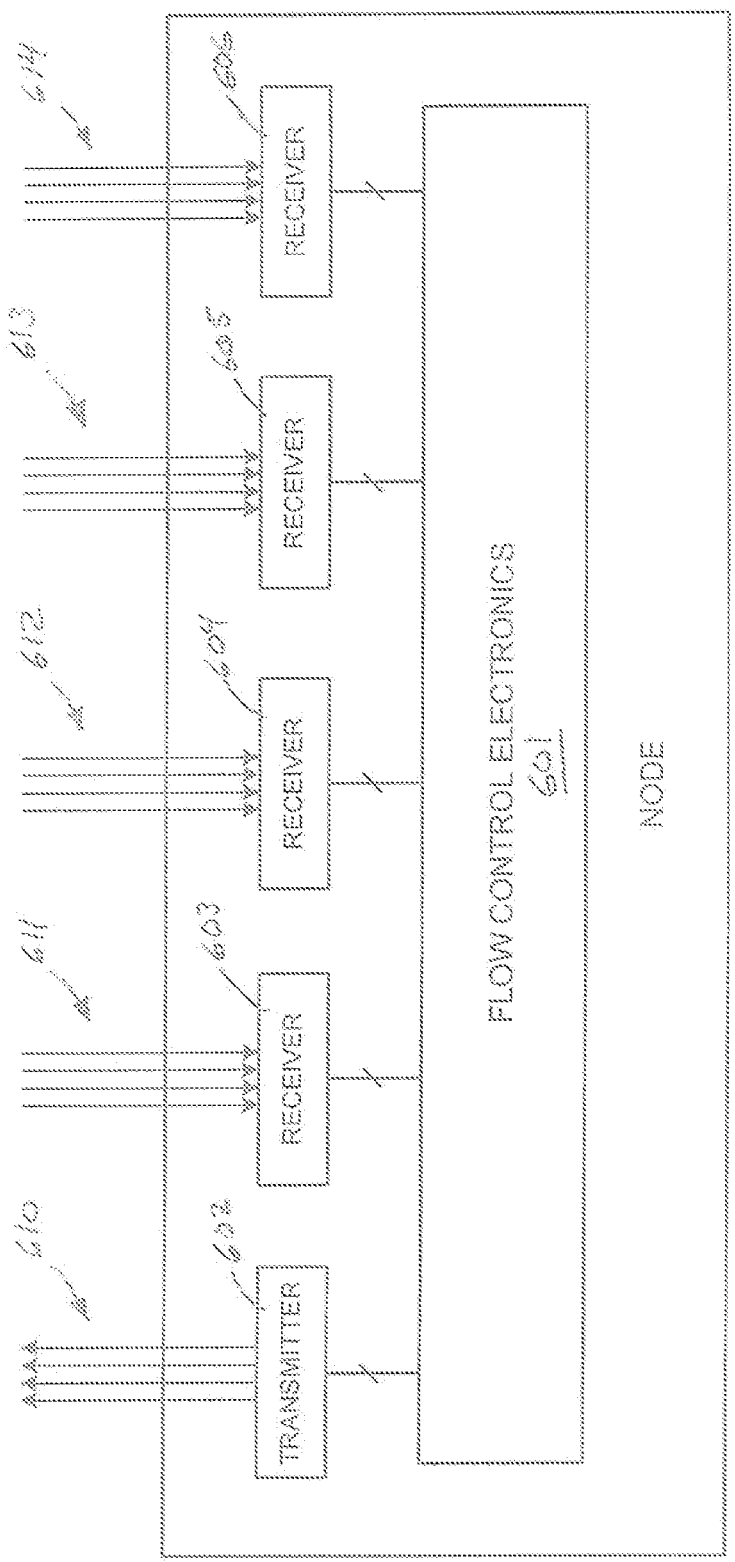
FIG. 6 shows a schematic representation of a node including flow-control electronics and a transceiver.

Each of the nodes 0-3 shown in FIGS. 1-4 includes flow-control electronics and a transceiver. FIG. 6 shows a schematic representation of a node including flow-control electronics 601 and an example transceiver comprising a transmitter 602 and four receivers 603-606. As shown in the example of FIG. 6, the flow-control electronics 601 are in electronic communication with the transmitter 602 and the receivers 603-606. The transmitter 602 can be configured with an array of light-emitting sources, such as light-emitting diodes, semiconductor edge-emitting lasers, or vertical-cavity surface-emitting lasers ("VCSELs"). In certain examples, the sources can be configured to emit electromagnetic radiation with approximately the same wavelength. In other examples, each source can be configured to emit a different wavelength providing for dense-wave division multiplexing channel spacing. In still other examples, the sources can be configured to emit wavelengths in wavelength ranges providing for coarse-wave division multiplexing channel spacing. The use of wavelength division multiplexing reduces the number of waveguides needed for the same number of channels. In the example shown in FIG. 6, the transmitter 602 comprises 4 sources, each of which is separately controlled by the flow-control electronics 601 to emit an optical signal. The transmitter 602 may include separate electronically operated modulators for modulating each channel of light generated by the transmitter 602. Directional arrows 610 each represent a separate optical signal generated by a corresponding source. In certain examples, the optical signals 610 can be sent in separate waveguides of a broadcast bus in the multibus optical interconnect fabric. For example, with reference to FIG. 3, the transmitter 602 can represent the transmitter of node 0 with each of the 4 optical signals 610 carried by one of the waveguides 301-304.

Each of the receivers 603-606 comprises an array of photodetectors. The photodetectors can be p-n junction or p-i-n junction photodetectors. Sets of arrows 611-614 each represent 4 optical signals generated by different nodes in the same manner as the optical signals generated by the transmitter 602. For example, referring to FIG. 3, the sets of optical signals 611 and 612 correspond to optical signals 310. In certain examples, each optical signal can be carried to a photodetector of a receiver via a separate waveguide. In other examples, each optical signal can be optically coupled directly from the associated broadcast bus to a photodetector of a receiver.

Flow-control electronics 601 are electronically coupled to the transmitter 602 and receivers 603-606. The flow-control electronics 601 may include drivers for operating the light-emitting sources of the transmitter 602 and may include amplifiers tar amplifying the electronic signals generated by the photodetectors of the receivers 603-606. The flow-control electronics receive electronic signals from a device, such as server in a data center, and send the electronic signals to the transmitter 602 to generate optical signals. The optical signals sent to the photodetectors of the receivers 603-606 are converted into separate corresponding electronic signals that are sent to the flow-control electronics 601. The flow-control electronics 601 controls the flow of data in the multibus optical interconnect fabric. The flow-control electronics 601 monitor the utilization of input buffers (not shown) associated with the node. A buffer is considered full when the amount of free space in the buffer falls below a predefined threshold. Each node periodically broadcasts the state of all of the buffers used to receive data broadcast by the other nodes. Because each node is connected to all of the buses over the optical fabric, each node knows the status of all the buffers in the system. When any buffer is full, the flow-control electronics 601 are configured to stop transmission on the corresponding bus to avoid butter overrun. The flow-control electronics 601 are configured to handle point-to-point and multicast communications.

Multicasting Flow Control

Examples of multicast flow-control operations carried out by the flow-control electronics of each node are now described with reference to FIGS. 7-14. When each node sends an optical signal over an associated broadcast bus in broadcast or a unicast, the optical signal includes one or more data packets. Each packet includes a header and user data. The header includes control information, such as information identifying the node that sent the packet and information identifying the node, or nodes, destined to receive the packet. Each node receives the packets broadcast by all of the nodes connected to the optical fabric, as described above, and examines the header information. On the one hand, if a node is not identified as a destination node in the header, the node discards the packet. On the other hand, if a node is identified as a destination node in the header, the packet is accepted and the user data is processed. Because multiple packets can arrive at the same destination node concurrently, buffering is used to temporarily store the user data sent to the destination node. Flow control is used to prevent buffer overflow in cases where the rate of packet arrival from the optical fabric exceeds the rate that packets can be forwarded to the external ports.

Figure 7:
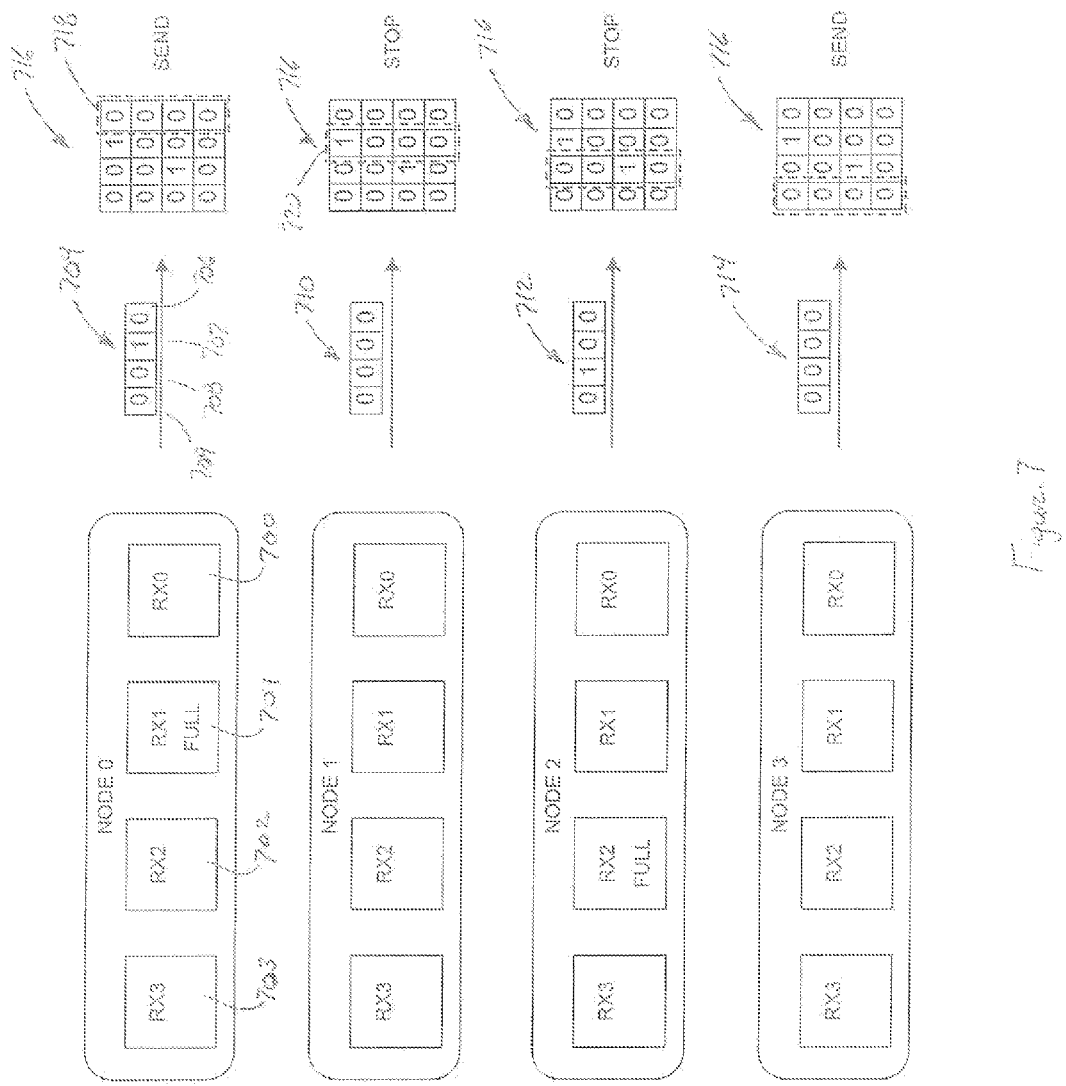
FIG. 7 shows a first example of buffers associated with four nodes configured and operated in accordance with one or more examples.

In order to prevent buffer overflow and provide flow control, each node includes a number of receive buffers for temporarily storing data sent to the node over the optical fabric. In certain examples, the number of receive buffers at each node corresponds to the total number of nodes coupled to the node's broadcast bus in the optical fabric. Each receive buffer separately and temporarily stores the data generated by each node connected to the node's broadcast bus. FIG. 7 shows an example of buffers associated with each of the nodes 0-3 described above. Each of the nodes includes four receive buffers identified by RX0, RX1, RX2, and RX3, where the numerical label identifies the node from which the data stored in the receive buffer originated from. Each receive buffer can be a region of memory used to separately and temporarily store the data sent by a particular node while the data is being input to the node. For example, each of the receive buffers 700-703 separately and temporarily stores data sent by corresponding nodes 0-3 and is destined for node 0. Receive buffer RX0 700 temporarily stores the data sent by node 0 and is sent back to node 0, as described above with reference to FIGS. 1-4: receive buffer RX1 701 temporarily stores data sent by node 1; receive buffer RX2 702 temporarily stores data sent by node 2; and receive buffer RX3 703 temporarily stores data sent by node 3.

In certain examples, the nodes can all broadcast status information regarding that storage space available at each receive buffer every x clock cycles, such as every 20 clock cycles. The buffer status information may also be broadcast any time a node has no data to send. When all of the nodes broadcast status information at approximately the same time, all of the nodes know which nodes have buffer space available and which nodes cannot receive any more data.

FIG. 7 also represents a snapshot of the status of the receive buffers associated with the nodes 0-3 at a particular point in time. In the example of FIG. 7, each buffer broadcasts its buffer status information, where a bit "0" identifies an associated receive buffer as "not full" and a bit "1" identifies an associated buffer as "full." The receive buffers 700, 702, and 703 of node 0 are not full and the receive buffer 701 is identified as "full." Node 0 broadcasts status information 704 composed of four entries 706-709 with each entry identifying the status of a particular receive buffer. Entries 706, 708, and 709 have binary logic values "0" which correspond to nut full receive buffers 700, 702 and 703, and entry 707 has a binary logic value "1" which corresponds to a full receive buffer 701. Node 1 broadcasts the status information 710; node 2 broadcasts the status information 712; and node 3 broadcasts the status information 714. After nodes 0-3 have broadcast their status information, each node collects the status information of all the other nodes and formulates a collective status report of the buffers, which is represented in FIG. 7 by an array 716. Rows in the status report 716 corresponds to the status information 704, 710, 712, and 714. Each node filters the collective status report to monitor only the status of the buffers connected to the node's broadcast bus. The information contained in each column of the collective status report 716 is associated with a particular node and can be used by the node to determine whether or not the node can broadcast. For example, column 718 indicates the status of the buffers connected to node 0's broadcast bus, and column 720 indicates the status of the buffers connected to node 1's broadcast bus. Each node desiring to broadcast data examines the status information of the nodes connected the sending node's broadcast bus and determines whether or not the sending node can broadcast. For example, node 0 examines the entries in column 718, which indicates that the receive buffers used by the nodes 0-3 to temporarily store data generated by node 0 are not full. As a result, node 0 can broadcast. However, when node 1 examines the entries in column 720 one of the entries is a bit "1," indicating that one of the nodes, node 0, does not have sufficient receive buffer space available for receiving data broadcast by node 1. As a result, node 1 does not broadcast data and has to wait for the next round of status information to determine whether or not broadcasting is permitted. The status report 716 also indicates that node 2 stops broadcasting, but node 3 can broadcast.

Figure 8:
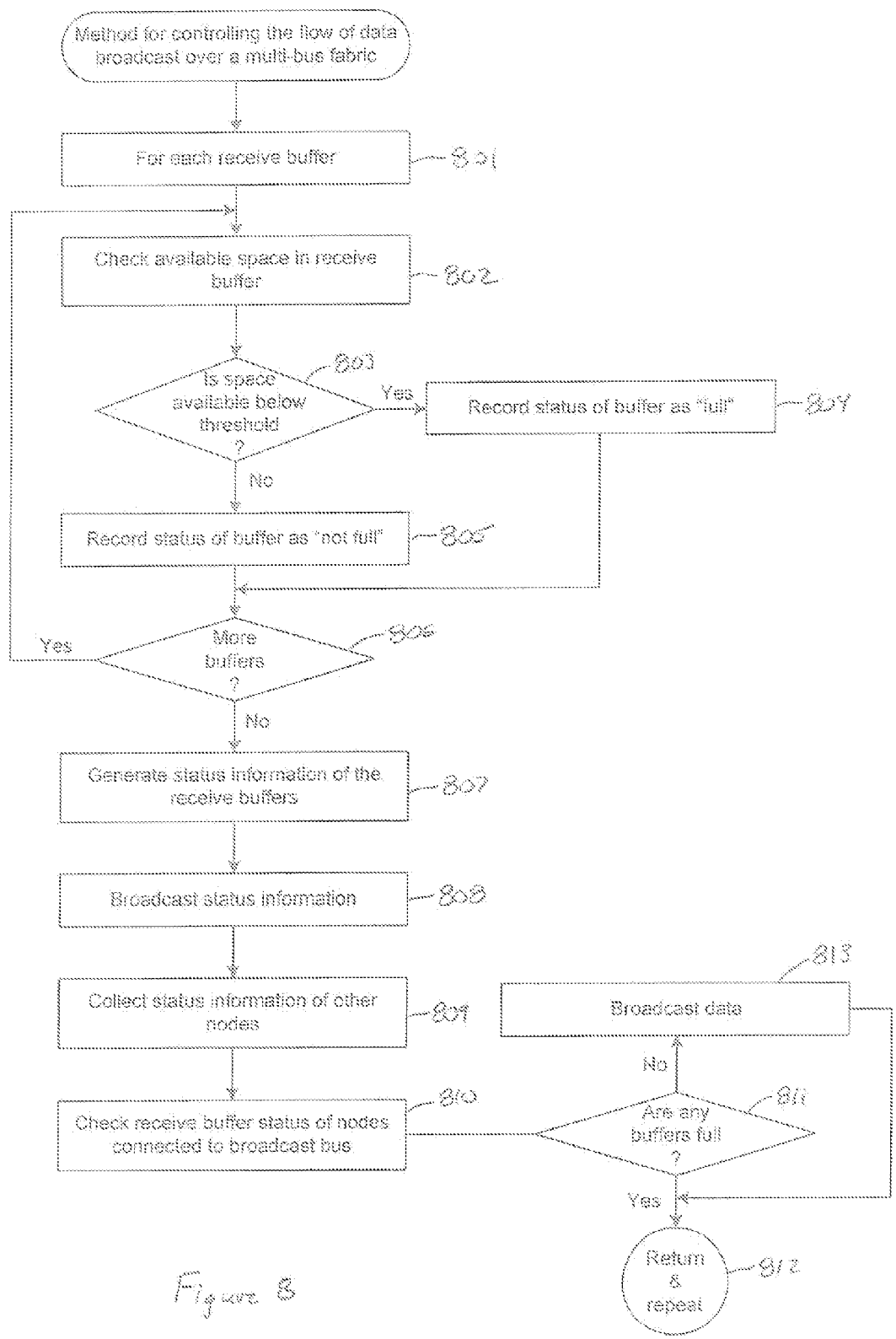
FIG. 8 shows a control-flow diagram of a method for controlling the flow of broadcast data in a multibus optical interconnect fabric carried in accordance with one or more examples.

FIG. 8 shows a control-flow diagram summarizing a method for controlling the flow of data broadcast over a multibus optical fabric carried out by each node. The steps represented in FIG. 8 are carried out by each node at the beginning of the dock cycle associated with broadcasting status information. In step 801, a for-loop repeats the steps 802-806 for each receive buffer of the node. In step 802, the node checks the available storage space in a receive buffer. In step 803, when the space available in the receive buffer is below a threshold, the method proceeds to the step 804; otherwise the method proceeds to step 805. In step 804, the node records the status of the receive buffer as "full." In step 805, the node records the status of the receive buffer as "not full." In step 806, if the available storage space of all of the receive buffers have been checked, the method proceeds to step 807, otherwise, the method repeats steps 802 through 805. In step 807, the node generates status information identifying which receive buffers are full and which receive buffers are not full. In step 808, the status information is broadcast over the optical fabric to all of the nodes connected to the node's broadcast bus. In step 809, the node collects the status information generated by the other nodes connected to the node's broadcast bus. In step 810, the node checks the receive buffer status associated with the other nodes connected to the broadcast bus. In step 811, if the node determines that any one of the buffers is full, the method proceeds to step 812, otherwise the method proceeds to step 813. In step 812, the node does not broadcast data and repeats the steps 801-811 at the start of the next clock cycle associated with checking and reporting the available storage status of the receive buffers. In step 813, the node broadcast data.

Multicasting flow control methods are not limited to controlling broadcast data. Flow control examples can also be applied to multicasting data to one or more nodes. As described above, the nodes can all broadcast status information regarding the storage space available at each receive buffer every clock cycles or any time a node has no data to send. When all of the nodes broadcast status information at approximately the same time, all of the nodes know which nodes have buffer space available and which nodes cannot receive any more data, as described above with reference to FIG. 7. But unlike the flow control applied to a broadcast, under a multicast routing scheme a node can send data to receive buffers of one or more destination nodes even though an associated receive buffer of a non-destination node is full. Note that if the node sends data exclusively to only one destination node with a not full receive buffer, then the sending node is engaging in unicast communication.

FIG. 9 represents a snapshot of the status of the receive buffers associated with the nodes 0-3 at a particular point in time during a data multicast. In the example of FIG. 9, each buffer broadcasts its buffer status information, as described above with reference to FIG. 7. Node 0 broadcasts the status information 902; node 1 broadcasts the status information 903; node 2 broadcasts the status information 904; and node 3 broadcasts the status information 905. After nodes 0-3 have broadcast their status information, each node collects the status information of all the other nodes and formulates a collective status report 908. As described above, rows in the status report 908 corresponds to the status information 902, 903, 904, and 905, and the information contained in each column of the status report 908 is associated with a particular node and can be used by the node to determine whether or not to send data to one or more nodes. However, unlike the flow control for a broadcast described above with reference to FIG. 7, for a multicast, each node can send data to the other nodes unless the associated receive buffer is full. For example, node 1 examines the entries in column 910, which indicates that the receive buffers used by the nodes 0-3 to temporarily store data generated by node 1 are not full. As a result, node 1 can send data to the nodes 0, 1, 2, and 3. On the other hand, when node 3 examines the entries in column 912 the entry associated with the receive buffer RX3 914 of node 2 is a bit "1," indicating that receive buffer RX3 914 of the node 2 is full, and node 2 does not have sufficient receive buffer space available for receiving data from node 3. As a result, node 3 does not send data to node 2, and has to wait for the next round of status information to determine whether or not sending data to node 2 is permitted. If, however, the data generated by node 3 is intended for nodes 0 and/or 1, even though node 2 cannot receive data from node 3, node 3 can send the data to nodes 0 and/or 1. Note that if node 3 sends data exclusively to one node, say node 0 or node 1, then node 3 is unicasting the data.

Figure 10A:
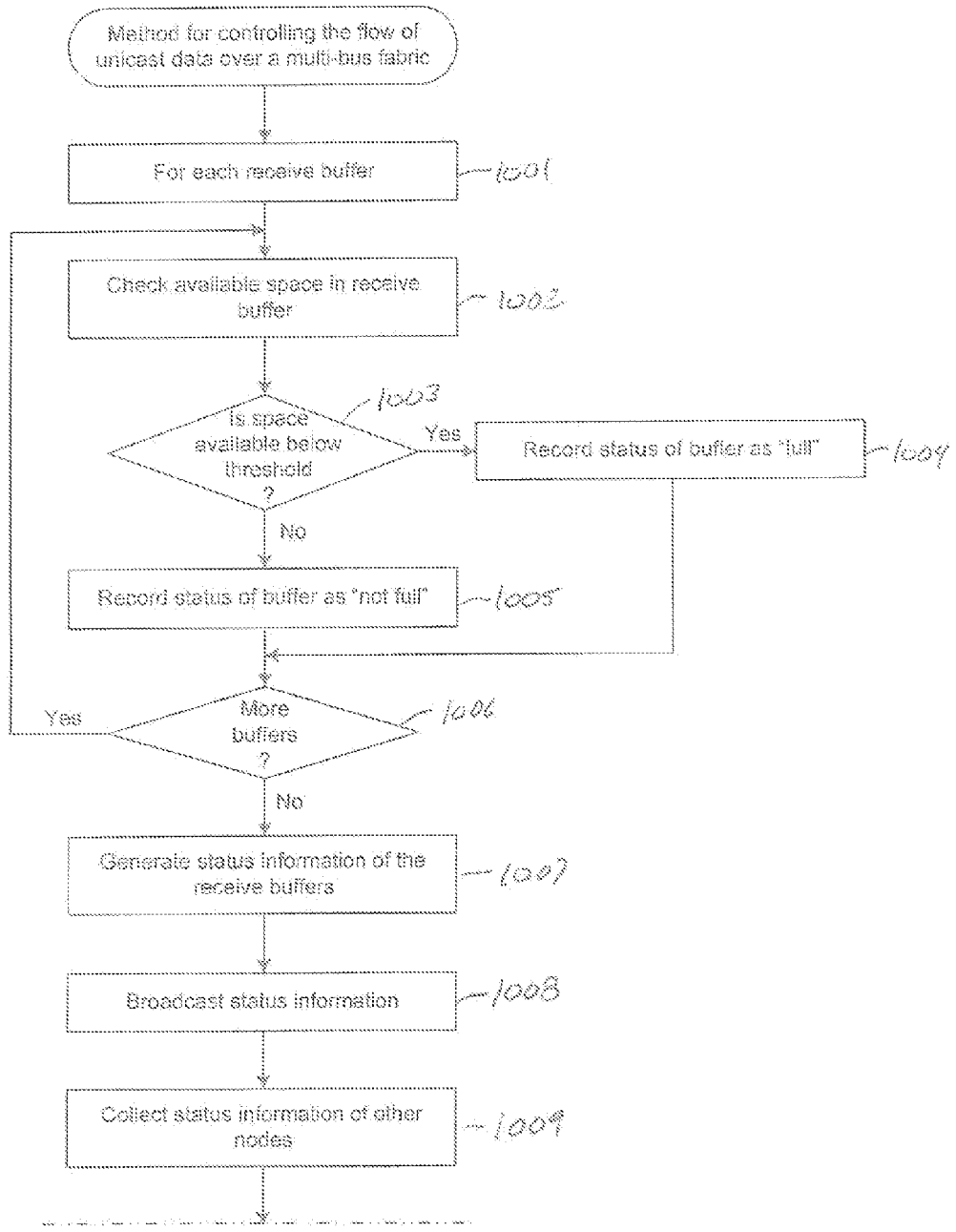
FIGS. 10A-10B show a control-flow diagram of a method for controlling the flow of unicast data in a multibus optical interconnect fabric carried in accordance with one or more examples.
Figure 10B:
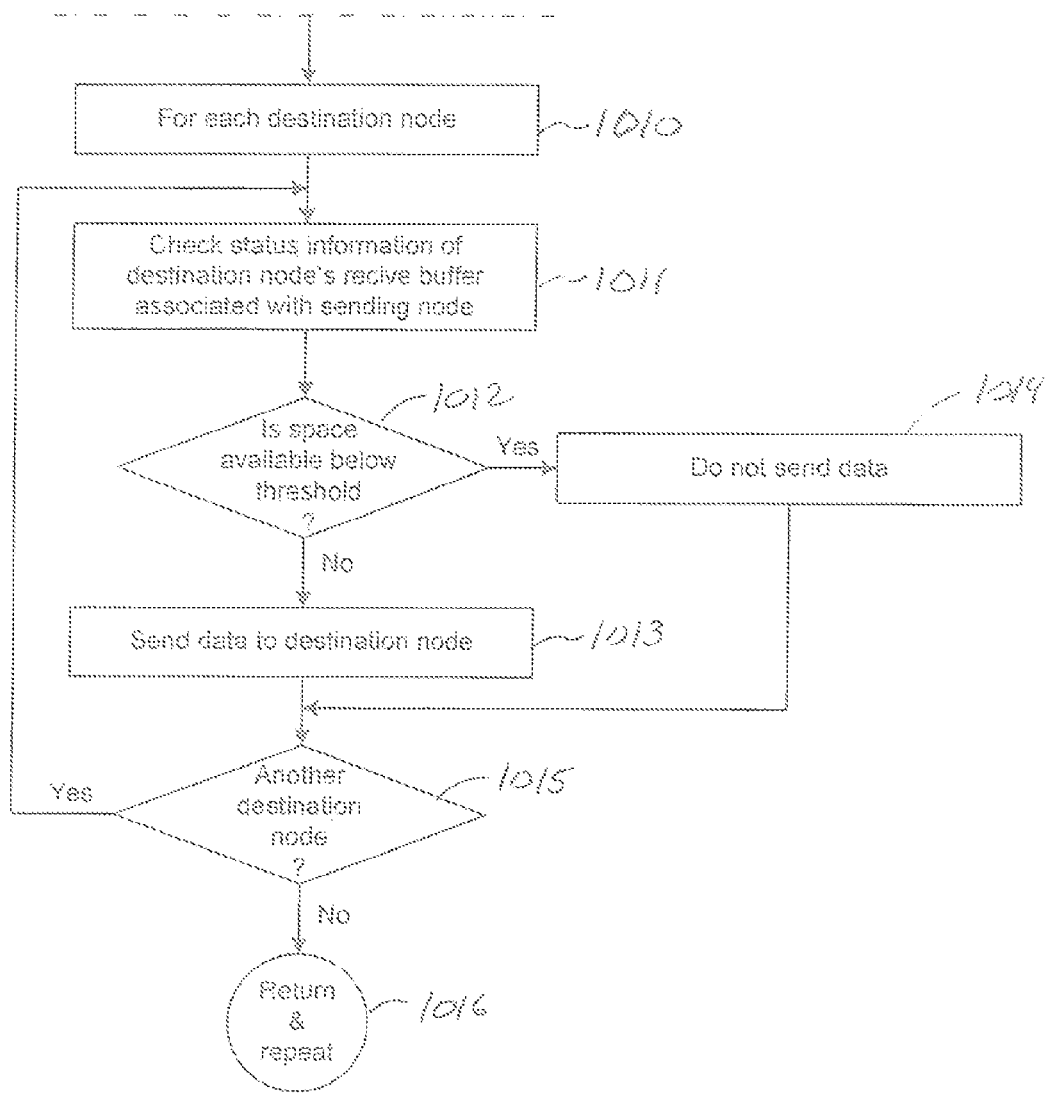

FIGS. 10A-10B show a control-flow diagram summarizing a method for controlling the flow of data multicast over a multibus optical fabric carried out by each node. Note that the first nine steps 1001-1009, shown in FIG. 10A, are the same as the first nine steps 801-809 of the method shown in FIG. 8. In FIG. 10B, once the node collects the status information generated by the other nodes connected to the node's broadcast bus of step 1009, the method proceeds to step 1010, shown in FIG. 10B. In step 1010, a for-loop repeats the steps 1011-1015 for each destination node. In step 1011, the sending node checks the status of the destination node's receive buffer for storing data generated by the sending node, as described above with reference to the example of FIG. 9. In step 1012, if the space available at the associated buffer is not below the threshold, the method proceeds to step 1013, otherwise the method proceeds to step 1014. In step 1013, the sending node sends the data to the destination node. In step 1014, the sending node does not send data to the destination node. In step 1015, if another destination's status information should be checked, the method proceeds to step 1011, otherwise the method proceeds to step 1016. In step 1016, the steps 1001-1015 are repeated at the start of the next clock cycle associated with checking and reporting the available storage status of the receive buffers.

Multicast Flow-Control Systems

Figure 11:
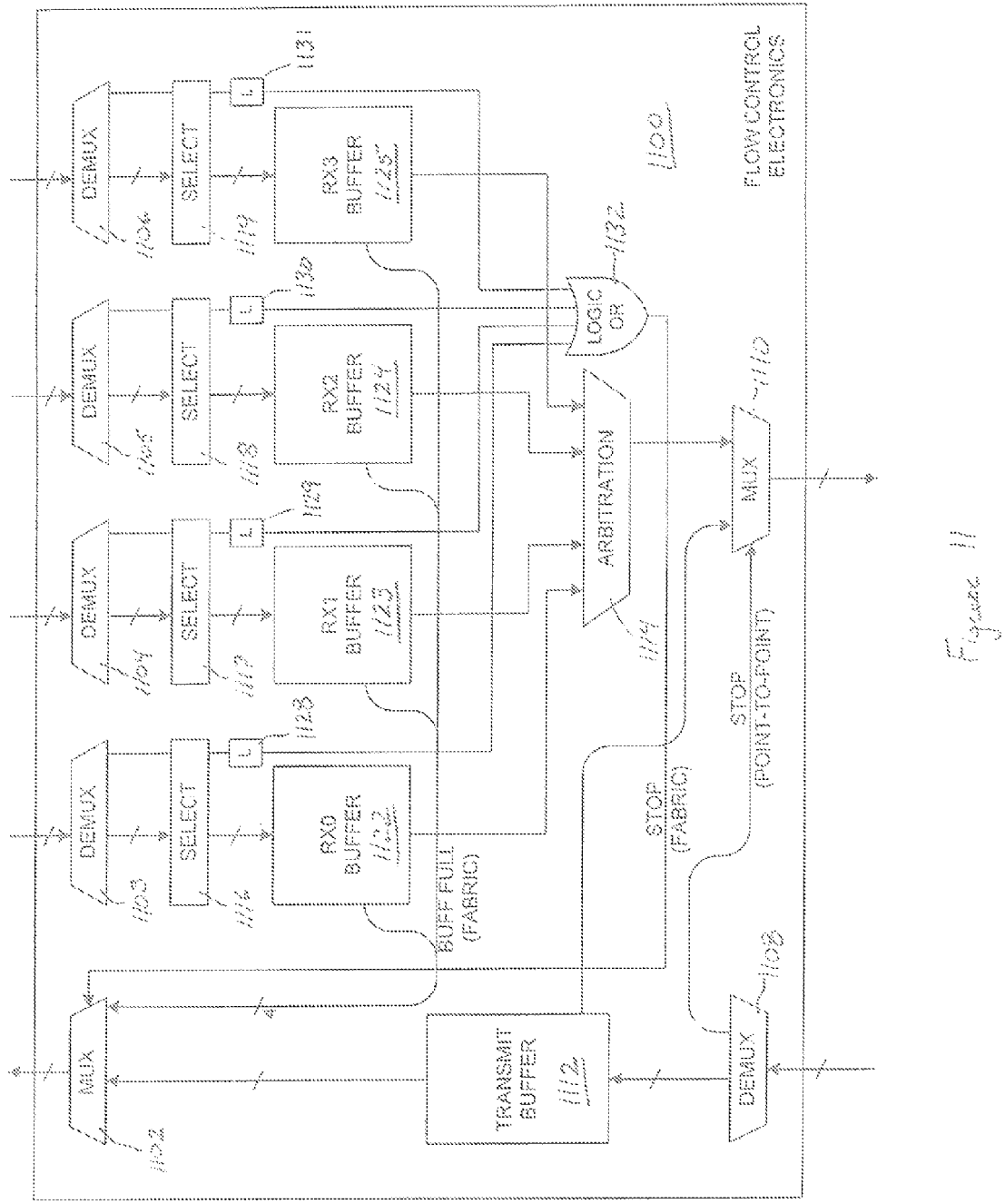
FIG. 11 shows a schematic representation of an example first logic circuit diagram for implementing flow-control electronics.

FIG. 11 shows a schematic representation of an example first logic circuit diagram 1100 for implementing data broadcasting flow-control electronics 601 described above with reference to FIG. 6. The circuit diagram represents an example implementation of the logic for buffering and flow control in a node interfacing between point-to-point links on multibus optical fabric, as described above with reference to FIGS. 7 and 8. The logic circuit diagram 1100 includes a multiplexer 1102 that transmits electronic signals to the transmitter 602 and receivers 1103-1106 that receive electronic signals from receivers 603-606, respectively. The circuit diagram 1100 also includes a demultiplexer 1108 and a point-to-point output multiplexer 1110 for interfacing with a computing device (not shown). For example, the computing device can be a line card of an optical switch, a server, a processor, and any other computing device. The demultiplexer 1108 receives data generated by the device and separates the data from the reverse flow control information that controls flow on the point-to-point output multiplexer 1110. The multiplexer 1110 sends the data to a transmit buffer 1112, where the data is temporarily stored before sending the data to the multiplexer 1102 which places the data on the corresponding broadcast bus of an optical fabric via the transmitter 602. The point-to-point output multiplexer 1110 is electronically coupled to an arbitration unit 1114 and the transmit buffer 1112. The transmitter buffer 1112 generates buffer status information which is sent to the multiplexor 1110. The buffer status may be a value indicating the available space or a single bit indicating the buffer is full. The multiplexor 1110 sends the transmit buffer status; 1) any time there is no data to be sent; 2) when the far end of the link cannot receive further data; 3) and periodically during data transmission. The demultiplexer 1108 is also in electronic communication with the multiplexer 1110 and inhibits the sending of data when the destination node has insufficient buffer space. The multiplexer 1102 sends the full/empty status information of the receive buffers 1122-1125 any time there is no data to send. Additionally if data is being sent continuously to the multiplexer 1102, the device periodically pauses data transmission, sends the receive buffer status information to the multiplexer 1102, so that the other end of the link has status information that is up to date within this time interval.

The demultiplexers 1103-1106 are in electronic communication with corresponding select circuits 1116-1119, which, in turn, are in electronic communication with corresponding receive buffers 1122-1125 and are in electronic communication with latches 1128-1131. Each demultiplexer 1103-1106 sends data packets to a corresponding select circuit. Rich select circuit reads the header and determines whether or not the data is destined for the device. For example, suppose the select circuit 1116 receives a data packet from the demultiplexer 1103. When the header indicates the data is destined for the device, the select circuit 1116 sends the data to the receive buffer RX0 1122, which temporarily stores the data. On the other hand, when the header indicates that the data is destined for a different device, the select circuit 1116 discards the data. Arbitration 1114 extracts the data stored in each receive buffer and transmits the data to the multiplexer 1110, where the data is forwarded to the device for processing. The arbitration 1114 can use any well-known technique for deciding which of the receive buffers 1122-1125 to extract data from.

Each of the receive buffers 1122-4125 is also in electronic communication with the multiplexer 1102 and periodically checks the amount of data storage space available and sends the status information to the multiplexer 1102, as described above with reference to FIGS. 7-8. The status information is transmitted from the multiplexer 1102 to the transmitter 602 and is broadcast to all of the nodes connected to the device's broadcast bus. The multiplexor 1102 continually broadcasts the receive buffer status when there is no data to send to the fabric. If data is being streamed continuously from the transmit buffer 1112, the multiplexor 1102 periodically interrupts data transmission to send the buffer status information provided by the receive buffers 1122-1125.

FIG. 11 also shows each of the select circuits 1116-1120 electronically connected to corresponding latches 1128-1131, which are connected to inputs of a logic OR gate 1132. The output of the logic OR gate 1132 is connected to the multiplexer 1102. During a receive buffer status reporting period described above, each of the demultiplexers 1103-1106 receives status information from a corresponding node connected to the device's broadcast bus. Each select circuit sends the status information to a corresponding latch. A latch outputs an electronic signal corresponding to bit "0" when the receive buffer on the corresponding node is not full and outputs an electronic signal corresponding to bit "1" when the receive buffer on the corresponding node is full. The logic OR gate 1132 receives the bits from the latches 1128-1131. When at least one of the bits sent by the latches 1128-1131 is "1," the logic OR gate 1132 generates and sends a status signal representing bit "1" to the multiplexer 1102, which causes the multiplexer 1102 stop sending data and only send buffer status information. The status signal stops transmission onto the optical fabric. On the other hand, when all of the bits sent to the latches 1128-1131 are "0," the logic OR gate 1132 sends a status signal representing bit "0," allowing data to be transmitted.

Figure 12:
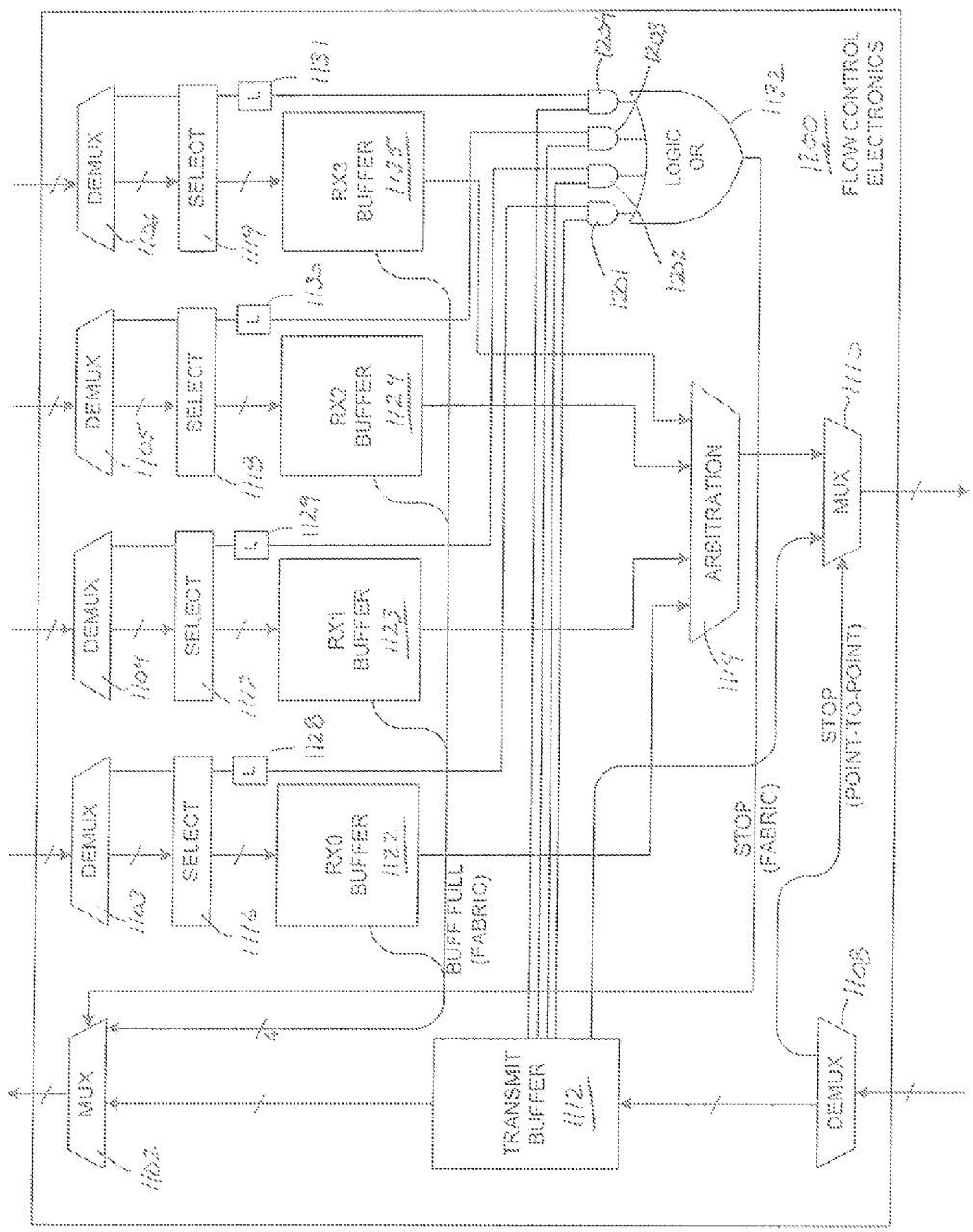
FIG. 12 shows a schematic representation of an example second logic circuit diagram for implementing flow-control electronics.

FIG. 12 shows a schematic representation of an example second logic circuit diagram 1200 for implementing data multicasting flow-control electronics 601 described above with reference to FIG. 6. The circuit diagram 1200 represents an example implementation of the logic for buffering and flow control in a node interlacing between point-to-point links on a multibus optical fabric, as described above with reference to FIGS. 9 and 10. As shown in the example of FIG. 12, the circuit diagram is similar to the circuit diagram 1100, except the circuit diagram includes logic AND gates 1201-1204. Each logic AND gate has one input from the transmit buffer 1112 and one input from one of the latches 1128-1131. For example. AND gate 1201 receives input from the transmit buffer 1112 and receives input from the latch 1128. The outputs from the AND gates 1201-1204 are four separate inputs to the OR gate 1132.

The AND gates 1201-1204 in combination with the OR gate 1132 can be used to control the flow of datamulticast to one or more nodes as follows. First, suppose each of the four nodes 0-3 is assigned a four bit word address represented in table 1:

| Node | Address |
|------|---------|
| 0 | 1000 |
| 1 | 0100 |
| 2 | 0010 |
| 3 | 0001 |

The transmit buffer 1112 receives data packets that are destined for particular nodes. The data packet includes the address of a destination node and each bit of the four bit address is sent to one of the AND gates 1201-1204. For example, the first bit "1" of the address "1000" is input to the AND gate 1201, the second bit "0" is input to the AND gate 1202, etc. As described above with reference to FIG. 9, each latch also inputs either a "0" bit or a "1" bit representing the status information associated with receive buffers. For example, if the receive buffer of node 0 is not full, the latch 1128 inputs a "0" bit to the AND gate 1201, and if the receive buffer of the node 1 is full, the latch 1129 inputs a "1" bit to the AND gate 1202. The four bit addresses of the destination nodes and the four bit status information associated with the corresponding receive buffers of the nodes are input to the logic AND gates 1201-1204 and the OR gate 1132 to determine whether or not data packets can be multicast to one or more destination nodes.

As an example, suppose the transmit buffer 1119 receives a data packet destined for node 1 (i.e., a unicast). The data packet includes the address of node 1 which is given by four bit word "0100," and a "0" bit is input to AND gate 1201, a "1" bit is input to AND gate 1202, and "0" bits are input to AND gates 1203 and 1204. Also suppose the latches 1128-1131 send the status information "0010," indicating that the receive buffer of node 2 is full, but the receive buffers of nodes 0, 1 and 3 are not full. The latch 1130 inputs a "1" bit to AND gate 1203 and the latches 1128, 1129, and 1131 each input a "0" bit to AND gates 1201, 1203, and 1204, respectively. As a result, the AND gates 1201-1204 each output a "0" bit into the tour inputs of the OR gate 1132, which outputs a status signal representing the bit "0," indicating that the data packet destined for node 1 and temporarily stored in the transmit buffer 1112 can be sent to node 1. By contrast, suppose the latches 1128-1131 actually sent the status information "0100," indicating, that the receive buffer of node 1 is full, but the receive buffers of nodes 0, 2 and 3 are not full. The latch 1129 inputs a "1" bit to AND gate 1202 and the latches 1128, 1130, and 1131 each input a "0" bit to AND gates 1201, 1203, and 1204, respectively. As a result, the AND gate 1202 receives two "1" bits at both inputs and outputs a "1" bit to the OR gate 1132. The OR gate 1132 outputs a status signal representing the bit "1" indicating that the data packet temporarily stored in the transmit buffer 1112 is not sent.

Figure 13:
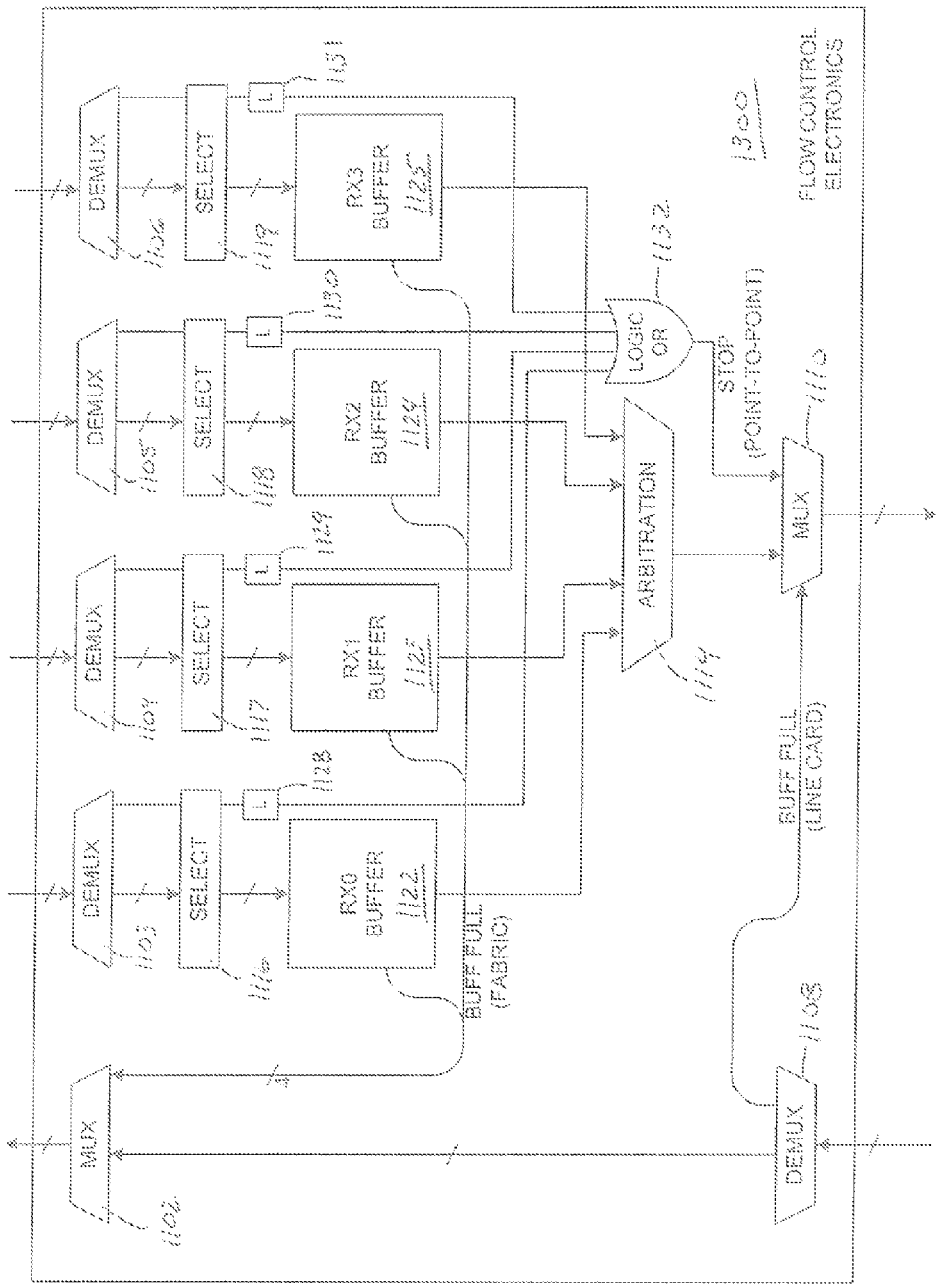
FIG. 13 shows a schematic representation of an example third logic circuit diagram for implementing flow-control electronics.

When the data rate onto the optical fabric is equal to or greater than the data rate from the point-to-point link, the transmit buffer 1112 from the point-to-point link can be omitted. However, with no transmit buffer 1112, data transmission cannot be stopped on this flow-control electronic device, but instead is stopped at the data source at the remote end of the point to point link. FIG. 13 shows a schematic representation of an example third logic circuit diagram 1300 for implementing data broadcasting flow-control electronics 601 described above with reference to FIG. 6, the circuit 1300 is similar to the circuit 1100 except the transmit buffer 1112 is omitted and the status signal output of the logic OR gate 1132 is input to the multiplexer 1110. In particular, when at least one of the bits sent by the latches 1128-1131 is "1," the logic OR gate 1132 sends status signal to the multiplexer 1110, and the multiplexer 1110 forwards the status signal to the device, which responds by not transmitting data. On the other hand, when all of the bits sent to the latches 1128-1131 are "0," the logic OR gate 1132 allows the device to send data to the demultiplexer 1108.

Note that because the stop point-to-point transmission signal takes a longer path in the circuit 1300 than in the circuit 1100, being forwarded across the point-to-point link to the device instead of controlling a transmitter 602, the threshold at which the receive buffers of the circuit 1300 are considered full is lower than the threshold at which the receive buffers of the circuit 1100 are considered full in order to allow more space for data in transit.

Figure 14:
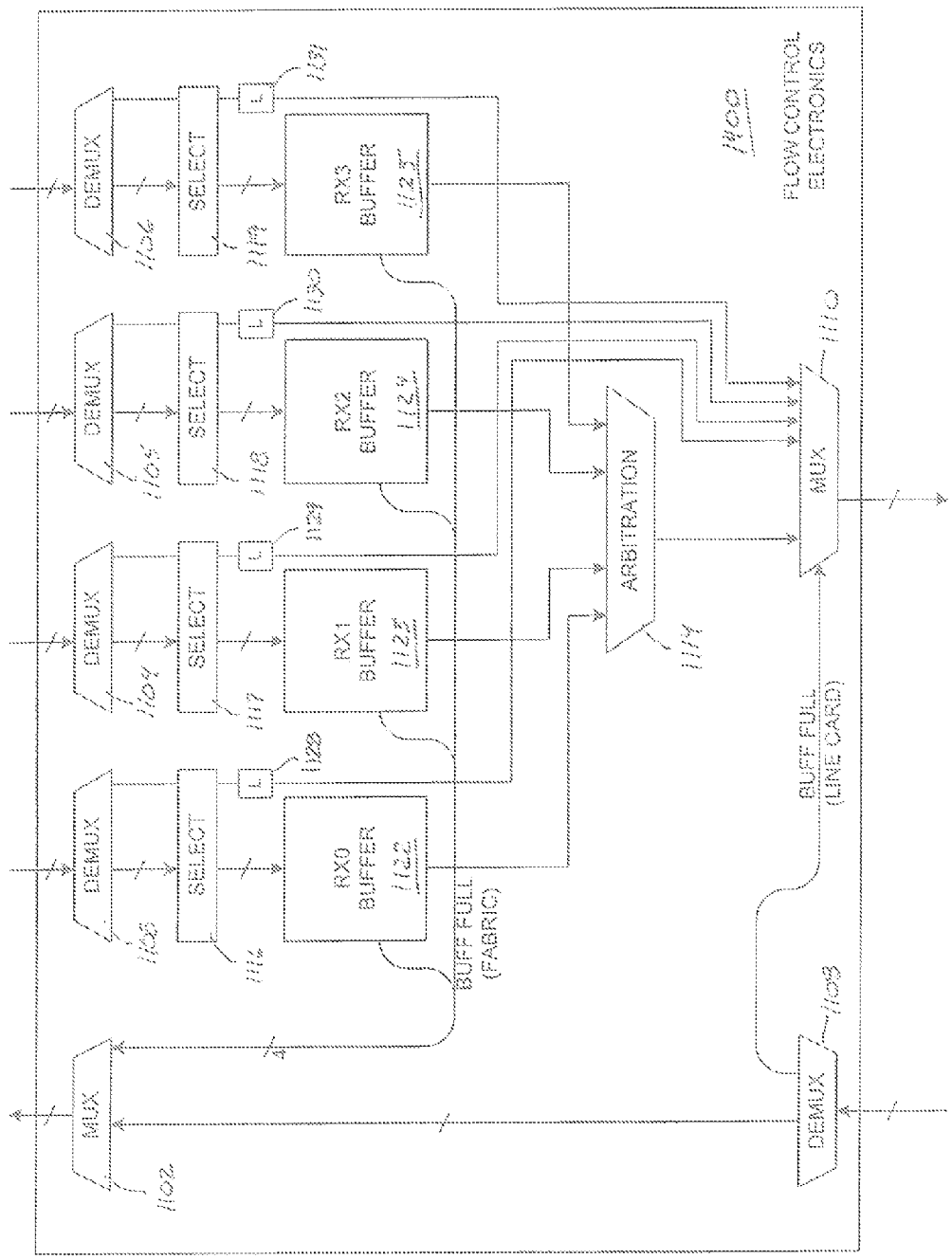
FIG. 14 shows a schematic representation of an example fourth logic circuit diagram for implementing flow-control electronics.

FIG. 14 shows a schematic representation of an example fourth logic circuit diagram 1400 for implementing data multicasting flow-control electronics 601 described above with reference to FIG. 6. The circuit 1400 is similar to the circuit 1200 except the transmit buffer 1112 and the OR gate 1132 are omitted and the status information output from the latches 1129-1131 is input to the multiplexer 1110. The electronic device then determines whether or not to send data to the destination node based on the status information.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for controlling the flow of data in a multibus optical interconnect fabric, the method comprising:
in each node device having an associated broadcast bus in the optical fabric,
generating status information regarding available data storage space of each receive buffer of the each node device;
broadcasting the status information to the other node devices connected to the broadcast bus via a transmitter in the each node device and the broadcast bus associated to the each node device;
collecting status information regarding the available storage space of receive buffers of the other node devices connected to the broadcast bus; and
determining whether or not to send data from the each node device to at least one of the other node devices over the broadcast bus based on the collected status information.

2. The method of claim 1, wherein generating the status information further comprises checking available data storage space of each receive buffer against a threshold.

3. The method of claim 1, wherein generating status information regarding available data storage space of each receive buffer further comprises recording the status of a receive buffer as full when the data storage space available is below a threshold.

4. The method of claim 1, wherein generating status information regarding available data storage space of each receive buffer further comprises recording the status of a receive buffer as not full when the data storage space available is above a threshold.

5. The method of claim 1, wherein the status information further comprises at least one of each receive buffer is identified as full, each receive buffer identified as not full, the amount of available storage space at each receive buffer.

6. The method of claim 1, wherein broadcasting the status information to the other nodes devices further comprises converting electronic signals encoding the status information into optical signals encoding the same information.

7. The method of claim 1, wherein broadcasting the status information to the other node devices further comprises sending the status information over the broadcast bus encoded in optical signals.

8. The method of claim 1, wherein collecting status information regarding the available storage space of receive buffers of the other node devices further comprises receiving the status information generated by each of the other node devices over broadcast buses associated with each of the other node devices.

9. The method of claim 1, wherein determining whether or not to send data to the other node devices over the broadcast bus further comprises broadcasting data over the broadcast bus to the other node devices when the receive buffers of the other node devices for storing data sent from the each node device are identified as not full.

10. The method of claim 1, wherein determining whether or not to send data to the other node devices over the broadcast bus further comprises multicasting data over the broadcast bus to one or more destination nodes of the other node devices when the receive buffer of the destination node devices are identified as not full.

11. A flow-control system comprising:
a receive buffer system configured to receive data from one or more nodes connected to the flow-control system, store the data associated with each of the nodes in a separate receive buffer and generate buffer status information;

a demultiplexer configured to receive data and control-flow information generated by a computing device connected to the flow-control system;

a first multiplexer coupled to the receive buffer system and the demultiplexer and configured to receive the data stored in the receive buffer system and the control-flow information from the demultiplexer and send the received data to the computing device; and a second multiplexer coupled to the receive buffer system and the demultiplexer and configured to send the data generated by the computing device or buffer status information generated by the receive buffer system, to the one or more nodes, based on the buffer space available at the nodes.

12. The system of claim 11, wherein the receive buffer system further comprises:

one or more demultiplexers, each demultiplexer configured to receive data and control flow information from one of the one or more nodes;

one or more select circuits, each selected circuit configured to receive data from one of the one or more demultiplexers discarding data and control flow information that is not addressed to that node;

one or more receive buffers, each receive buffer configured to receive data from one of the one or more select circuits; and an arbitration unit configured to arbitrate the extraction of data stored in each of the receive buffers and send the data the first multiplexer.

13. The system of claim 12, wherein the buffer status information comprises status information regarding available data storage.

14. The system of claim 12, further comprising:

one or more latches, each latch configured to receive status information from one or the one or more select circuits; and a logic OR gate configured to receive as input the output from the one or more latches and output a status signal indicating that at least one of the one or more nodes does not have available buffer space.

15. The system of claim 14, wherein the logic OR gate is configured to send the status signal to the first multiplexer directing the computing device to stop sending data to the flow-control system.

16. The system of claim 14, wherein the logic OR gate is configured to send the status signal to the second multiplexer directing a transmitter coupled to the second multiplexer to stop sending the data generated by the computing device.

17. The system of claim 14, further comprising one or more logic AND gates, each logic AND gate receives as input the output from one of the one or more latches and receives as input a signal from a transmit buffer and outputs a signal to the logic OR gate, wherein the transmit buffer temporarily stores the data sent to the flow-control system from the computing device.

18. The system of claim 11, further comprising a transmit buffer configured to temporarily store the data sent to the flow-control system from the computing device.

19. The system of claim 11, wherein a receive buffer system configured to receive data from one or more nodes further comprises the flow-control system and the one or more nodes coupled to a multibus optical interconnect fabric such that each of the nodes sends data encoded in optical signals to the flow-control system over separate broadcast buses of the optical fabric.

20. The system of claim 11, wherein the second multiplexer configured to send the data generated by the computing device to at least one of the one or more nodes further comprises a transmitter coupled to the second multiplexer, the transmitter configured to convert the data sent to the multiplexer in optical signals that are sent over a broadcast bus of a multibus optical interconnect fabric.

* * * * *

UNITED STATES PATENT AND TRADEMARK OFFICE
CERTIFICATE OF CORRECTION

PATENT NO. : 8,391,717 B2
APPLICATION NO. : 12/785962
DATED : March 5, 2013
INVENTOR(S) : Moray McLaren et al.

It is certified that error appears in the above-identified patent and that said Letters Patent is hereby corrected as shown below:

In the Specification

In column 6, line 14, delete "communicated" and insert -- communicate --, therefor.

In column 7, line 37, delete "or a" and insert -- or --, therefor.

In the Claims

In column 14, line 37, in Claim 6, delete "nodes" and insert -- node --, therefor.

In column 15, line 30, in Claim 12, delete "data the" and insert -- data to the --, therefor.

Signed and Sealed this
Seventeenth Day of September, 2013

Teresa Stanek Rea
*Deputy Director of the United States Patent and Trademark Office*